(12) United States Patent
Nishimura et al.

(10) Patent No.: US 8,289,827 B2
(45) Date of Patent: Oct. 16, 2012

(54) RECORDING MEDIUM, OPTICAL DISK APPARATUS AND WRITING METHOD

(75) Inventors: Koichiro Nishimura, Ebina (JP); Masaaki Kurebayashi, Ebina (JP); Tsuyoshi Toda, Kodaira (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/974,330

(22) Filed: Oct. 12, 2007

(65) Prior Publication Data
US 2008/0037395 A1    Feb. 14, 2008

Related U.S. Application Data

(63) Continuation of application No. 10/719,285, filed on Nov. 20, 2003, now Pat. No. 7,304,931.

(30) Foreign Application Priority Data

May 8, 2003    (JP) .................................. 2003-129677
Sep. 22, 2003  (JP) .................................. 2003-329289

(51) Int. Cl.
*G11B 15/52* (2006.01)

(52) U.S. Cl. ..................................................... 369/47.51

(58) Field of Classification Search ........................ None
See application file for complete search history.

(56) References Cited

U.S. PATENT DOCUMENTS

| | | | |
|---|---|---|---|
| 5,309,419 A | 5/1994 | Koike | |
| 6,459,666 B1 | 10/2002 | Yokoi | |
| 6,628,595 B1 | 9/2003 | Sasa et al. | |
| 7,068,579 B2 | 6/2006 | Tasaka et al. | |
| 2002/0105875 A1 | 8/2002 | Ushiyama et al. | |
| 2002/0114233 A1 | 8/2002 | Sasaki et al. | |
| 2003/0012917 A1* | 1/2003 | Harigaya et al. | 428/64.4 |
| 2003/0035355 A1* | 2/2003 | Morishima | 369/47.53 |
| 2003/0227850 A1* | 12/2003 | Kato et al. | 369/59.11 |

FOREIGN PATENT DOCUMENTS

| | | |
|---|---|---|
| JP | 2000-149262 | 5/2000 |
| JP | 2001-118245 A | 4/2001 |

(Continued)

OTHER PUBLICATIONS

Japan Patent Office (JPO) office action dated Nov. 20, 2007 for JPO patent application JP2001-388162.

(Continued)

*Primary Examiner* — Christopher R Lamb
(74) *Attorney, Agent, or Firm* — Kilpatrick Townsend & Stockton LLP

(57) ABSTRACT

Recording parameters are decided so that the time control information on at least the front edge and the rear edge of a parameter forming a mark of twice size or above of the laser spot diameter focused on the recording medium is substantially proportional to the recording linear velocity. The mark is recorded and reproduced at a predetermined linear velocity to obtain an electric signal waveform having a time width Tm. A parameter is decided so as to control the laser pulse for recording information so that a voltage value change amount at two points at a distance Ts (Ts<Tm/2) in the time axis direction before and after the time position Tm/2 from the front edge of the waveform is substantially constant for the recording linear velocity change. Identification information indicating the parameter is described on the recording medium.

10 Claims, 6 Drawing Sheets

FOREIGN PATENT DOCUMENTS

| | | |
|---|---|---|
| JP | 2001-184651 A | 7/2001 |
| JP | 2001-229564 | 8/2001 |
| JP | 2001-297436 | 10/2001 |
| JP | 2001-297436 A | 10/2001 |
| JP | 2002-260226 A | 9/2002 |
| JP | 2003-085753 A | 3/2003 |

OTHER PUBLICATIONS

DVD+RW/+R, http://www.catnet.ne.jp/triceps, Jan. 22, 2002, 3 pages.

* cited by examiner

RECORDING MEDIUM, OPTICAL DISK APPARATUS AND WRITING METHOD

BACKGROUND OF THE INVENTION

The present invention relates to a technique for recording information onto an optical disk by using a laser beam.

In a rewritable optical disk such as DVD-RAM, DVD-RW, CD-RW and a write once disk such as DVD-R and CD-R, information is recorded by applying a laser beam onto the disk recording surface. As the laser beam application method for forming a recording mark on the recording surface of the optical disk, there is a CD-R method for forming a recording mark by applying a recording pulse having time width according to the length of the recording mark, a DVD-RAM method for making the recording mark forming pulse comb-shape so as to control head accumulation and to form an optimal recording mark, and the like. The waveform of the recording pulse to obtain the optimal recording mark is called write strategy.

FIG. 1 schematically shows a write strategy of 4.7 GB-capacity DVD-RAM (hereinafter, referred to simply as DVD-RAM) which is one of the rewritable optical disks. FIG. 1 shows the write strategy when recording 11T (T is a recording clock cycle) mark. As shown in the figure, the DVD-RAM write strategy consists of a first pulse defined by TSFP, TEFP, TFP, a repeated pulse (multi pulse) defined by TMP, and a last pulse defined by TSLP, TELP, TLP. It should be noted that the laser power level may be binary and tertiary. Here, for simplification, the binary case is shown.

The first pulse of this write strategy may be defined by "a method for defining the waveform rise and fall end absolute time by the TSFP and FEFP" or "a method for defining the rise edge absolute time and the pulse time width by the TSFP and TFP.

Moreover, the last pulse also may be defined by two methods: "a method for defining the edge absolute time by the TSLP and TELP" or "a method for defining the fall edge absolute time and the pulse time width by the TELP and TLP".

The TSFP which is a value deciding the time position of the front edge of the first pulse and the TELP which decides the time position of the rear edge of the last pulse are varied according to the recording mark length and the preceding and the following space length. This is because affect of the heat accumulation and heat diffusion by the laser beam when recording a mark varies depending on the recording mark length and the preceding and following space length.

FIG. 2 shows an example of adjustment table of TSFP and TELP. The 3T, 4T, 5T, ≧6T (6T or more) arranged in the longitudinal direction of the TSFP table represent the space length immediately before the recording mark while the 3T, 4T, 5T, ≧6T (6T or more) in the lateral direction represent mark length. Similarly, in the TELP table, the 3T, 4T, 5T, ≧6T (6T or more) arranged in the longitudinal direction represent the space length immediately after the recording mark while the 3T, 4T, 5T, ≧6T (6T or more) in the lateral direction represent mark length to be recorded. Since the values in the adjustment table shift the edge of the write strategy decided by TSFT and TELP, hereinafter these tables will be referred to as shift tables. Moreover, values deciding the edge timing of the recording waveform such as TSFP described in FIG. 1 and the aforementioned shift tables will be referred to as recording parameters (parameter group).

The method of modifying the write strategy by the relationship between the recording mark and the space length is used not only in the DVD-RAM but also in the other rewritable phase-change type medium DVD-RW, CD-RW and in the write once type pigment type medium DVD-R, CD-R, and the like.

Conventionally, for the recording parameters, the value which a medium manufacturer considers optimal under the condition of the constant linear velocity is recorded on the medium and provided. Since the write strategy form including the power level and the timing and the optimal values of the recording parameters such as shift tables significantly vary depending on the recording medium composition and material, it has been considered preferable that the medium manufacturer suggest the write strategy. For example, in the DVD-RAM, the aforementioned recording parameters are recorded in the physical format information (PFI) area in the control data zone arranged in the lead in area. It should be noted that the aforementioned conventional technique is disclosed in JP-A-2003-085753 and JP-A-2002-260226.

SUMMARY OF THE INVENTION

In the same as the recording medium has irregularities in the composition and material, an optical disk recording apparatus (hereinafter, referred to as "drive") also has irregularities in the laser output power and circuit characteristics. Accordingly, the optimal recording parameter in a particular drive may not be the optimal recording parameter in another drive. Especially the recording parameter recorded on the medium is an optimal parameter when recording is performed at a particular linear velocity. When recording information onto the recording medium at a linear velocity other than the particular linear velocity, the recording parameter recorded on the medium in advance is not optimal. Accordingly, when performing recording at a linear velocity other than the linear velocity corresponding to the optimal parameter recorded in advance, it is preferable that the drive decide the optimal parameter at the linear velocity.

However, in the drive for recording information on a recording medium where an optimal recording parameter at a particular linear velocity is described, conventionally, no consideration has been taken on the method to obtain an optimal recording parameter at a linear velocity other than the particular linear velocity at the drive side.

It is therefore an object of the present invention to provide a method for preferably deciding a recording parameter provided by a medium manufacturer and a method to obtain, by using this recording parameter, a recording parameter at a linear velocity other than the linear velocity estimated by the medium manufacturer.

Next, explanation will be given on the variable velocity writing method which switches the write strategy when a predetermined linear velocity is reached.

In general, the heat diffusion amount at the front edge of the recording mark is proportional to the recording linear velocity while the heat accumulation amount at the rear edge is proportional to the square root of the recording linear velocity. Moreover, an energy amount given to the recording medium by the laser beam irradiation of a predetermined power level such as a recording power and an erase power is proportional to the laser beam irradiation power level per unit area and substantially proportional to the recording velocity.

However, if the write strategy is different, the aforementioned proportional relationship between the heat diffusion amount, heat accumulation amount, recording laser power and the recording velocity is broken. Accordingly, a recording parameter at an arbitrary linear velocity obtained by simple interpolation method (interpolation method, extrapolation method) of an optimal recording parameter at a plurality of linear velocities recorded in the recording medium in advance, generally, cannot be an optimal recording parameter. For this, in the writing method in which the recording linear velocity is successively changed like CAV (constant angular velocity) recording, it is difficult to realize a preferable variable speed recording by successively calculating the optimal recording parameter at the respective recording linear velocities.

During the CAV recording, it is possible to use a writing method for switching the write strategy each time a predetermined linear velocity is reached. However, when such a writing method is employed, the write strategy is abruptly switched at a predetermined position and as has been described above, the aforementioned proportional relationship becomes discontinuous. Accordingly, the same mark (for example, 3T mark) changes its shape before and after the strategy switching. Thus, when reproducing data immediately after the write strategy switching position, the equalizer, group delay and other reproduction parameter characteristic switching cannot follow the recording mark characteristic switching and there arises a problem of deterioration of the reproduction quality when the areas before and after the write strategy switching are reproduced continuously.

A second object of the present invention is to assure continuity of recording parameters, assure continuity of the recording mark shape, and improve the reproduction quality.

In order to achieve this object, there is provided a recording medium on which information is recorded by applying a laser pulse to form a mark on a recording layer, wherein identification information is recorded to indicate that a plurality of control parameter groups are recorded which have the laser pulse power level changing timing substantially proportional to the recording velocity for recording a mark of length not smaller than the laser spot diameter in the recording layer.

According to another aspect of the invention, there is provided a recording medium on which information is recorded by applying a laser pulse to form a mark on a recording layer, the recording medium containing control parameters recorded for respective linear velocities decided by: a step of recording a first mark having a length not smaller than the laser spot diameter in the recording layer at a first linear velocity, a step of recording a second mark having a length equivalent to the first mark at a second linear velocity, a step of calculating a voltage value change amount at two points at a distance Ts (Ts<Tm/2) in the time axis direction before and after the time position reference Tm/2 from the front edge of an electric signal waveform obtained by reproducing the first or the second mark at a predetermined linear velocity and having a time width Tm, and a step of deciding a control parameter of the laser pulse power level change timing so that the aforementioned change amount is substantially constant during recording at any of the linear velocities.

According to still another aspect of the invention, there is provided an optical disk apparatus comprising a laser for applying a laser beam onto an optical disk, laser control means for controlling the laser, and rotation drive means for driving the optical disk to rotate, so that a laser pulse is applied onto a recording layer of the optical disk to form a mark, thereby recording information on the optical disk, wherein the laser control means changes recording linear velocity successively or stepwise for continuous recording by using such a control parameter that a change timing of the power level of the laser pulse for recording a mark having a length not smaller than the laser spot diameter in the recording layer is substantially proportional to the recording linear velocity.

According to yet another aspect of the present invention, there is provided an optical disk apparatus comprising a laser for applying a laser beam onto an optical disk, laser control means for controlling the laser, and rotation drive means for driving the optical disk to rotate, so that a laser pulse is applied onto a recording layer of the optical disk to form a mark, thereby recording information on the optical disk, wherein continuous recording in which the recording linear velocity changes successively or stepwise is performed by using control parameters for respective linear velocities decided by: a step of recording a first mark having a length not smaller than the laser spot diameter in the recording layer at a first linear velocity, a step of recording a second mark having a length equivalent to the first mark at a second linear velocity, a step of calculating a voltage value change amount at two points at a distance Ts (Ts<Tm/2) in the time axis direction before and after the time position reference Tm/2 from the front edge of an electric signal waveform obtained by reproducing the first or the second mark at a predetermined linear velocity and having a time width Tm, and a step of deciding a control parameter of the laser pulse power level change timing so that the aforementioned change amount is substantially constant during recording at any of the linear velocities.

According to yet still another aspect of the present invention, there is provided a writing method for recording information on an optical disk by applying a laser pulse on a recording layer of the optical disk so as to form a mark, wherein recording linear velocity is changed successively or stepwise for continuous recording by using such a control parameter that a change timing of the power level of the laser pulse for recording a mark having a length not smaller than the laser spot diameter in the recording layer is substantially proportional to the recording linear velocity.

The present invention assures continuity of the shape of a reproduction waveform, thereby enabling stable reproduction. Moreover, it is possible to easily calculate a recording parameter at a recording velocity other than the recording velocity where the recording parameters provided by a medium manufacturer are defined, from the recording parameters provided by the medium manufacturer. Accordingly, when performing CAV recording, it is possible to calculate a preferable recording parameter.

Moreover, for a drive manufacturer, it is possible to simplify the write strategy setting method when realizing a high velocity recording by the CAV recording, reduce the drive development time, and reduce the learning time when adjusting the write strategy in the drive.

Moreover, by using the procedures of the present invention in the drive, it is possible to calculate the write strategy and the recording parameter coping with the variable velocity recording so as to realize a variable velocity recording such as CAV recording in a medium not having any recording parameters provided by a medium manufacturer coping with the variable velocity recording. Furthermore, by referencing the variable velocity recording flag, it is possible to easily identify a medium supporting the variable velocity recording and reduce the write strategy learning time when performing the variable velocity recording.

Other objects, features and advantages of the invention will become apparent from the following description of the embodiments of the invention taken in conjunction with the accompanying drawings.

DETAILED DESCRIPTION OF THE EMBODIMENTS

[Embodiment 1]

Explanation will be given on the first embodiment by using the DVD-RAM as an example. As has been described above, in the DVD-RAM, the recording parameter is selected by a medium manufacturer and shipped.

Currently, as the DVD-RAM standard, double speed (hereinafter, referred to as "2×") recording standard and triple speed (hereinafter, referred to as "3×") recording standard are released. Release of five-times speed (hereinafter, referred to as "5×") recording standard is expected. That is, the 5× recording disk (hereinafter, referred to as DVD-RAM 5×) is probably provided with the 2× recording and 3× recording parameter, considering the compatibility with a lower apparatus. Moreover, by using the recording parameters of the respective recording velocities, in the 5× recording drive, it is possible to perform CAV recording with recording velocity of 2× at the innermost circumference and 5× at the outermost circumference. An example of recording parameter decision procedure in the respective recording velocitys for recording onto the DVD-RAM will be explained below.

Procedure 1. Recording Parameter Estimation

In the procedure 1, firstly, recording parameters at the respective recording velocities provided, i.e., 2×, 3×, 5× are tentatively set in the linear value of the recording velocity. This is because in order to cope with the variable speed recording such as CAV recording, linearity is required between the recording parameters provided and the recording velocity.

Procedure 2. Long Mark Reproduction Waveform Adjustment and Basic Recording Parameter Linearity Check In the procedure 2, by using the tentative recording parameters set in the procedure 1, a long mark of 6T or more is recorded at each recording velocity and reproduction waveforms obtained when reproduction is performed at a constant speed are compared.

In general, in optical disk reproduction, when reproducing a mark almost equal to or greater than a spot diameter, the reproduction signal amplitude level is saturated and the waveform shift difference generated by the spot shape difference is small. In the case of the DVD-RAM of the present embodiment, the diameter of beam for reproduction is 0.86 μm and the amplitude value of the 6T signal or above equivalent to the 0.84 μm length which is almost identical to the beam diameter is almost constant. Accordingly, the recording parameter initial adjustment is performed by using a waveform of a long mark of the 6T or above as a reference and after this, the recording parameter for forming a short mark is adjusted. This reproduction velocity may be the lowest reproduction velocity defined by the medium.

Figure 3A:
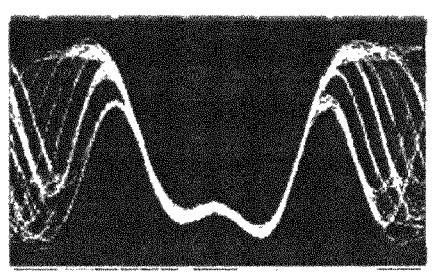
FIG. 3A and FIG. 3B are an example of a 10T mark reproduction waveform and its schematic diagram.
Figure 3B:
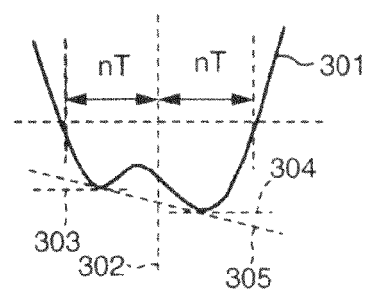

FIG. 3 shows a reproduction waveform 301 of a long mark (10T) recorded at a certain recording velocity in the DVD-RAM. FIG. 3 is an example of the 10T waveform and the low portion of the waveform indicates a dark portion (mark portion). Moreover, the reproduction velocity is 2×, and the reproduction system parameter is the standard parameter described in the DVD-RAM specification. FIG. 3B shows a waveform schematically extracted from the waveform of FIG. 3A. Here, the waveform is separated to the front part and the rear part with respect to the center of the recording mark waveform, i.e., the 5T position 302 in this case. The minimum value 303 of the front part and the minimum value 304 of the rear part are extracted and the inclination A2× of the straight line 305 connecting the both waveform positions is calculated.

The inclinations at 3× and 5× are also calculate to obtain A3× and A5×. A medium manufacturer decides the recording parameters provided as follows. That is, the recording parameters at the respective velocities are adjusted so that the values of A2×, A3×, A5× are almost identical (preferably within a range of ±10%).

It should be noted that here, adjustment has been made according to the inclination of the minimum value of the front part and the minimum value of the rear part. However, the present invention is not to be limited to this. it is also possible to calculate an inclination between two points positioned at a predetermined distance from the mark center and make adjustment according to the inclination.

Figure 1:
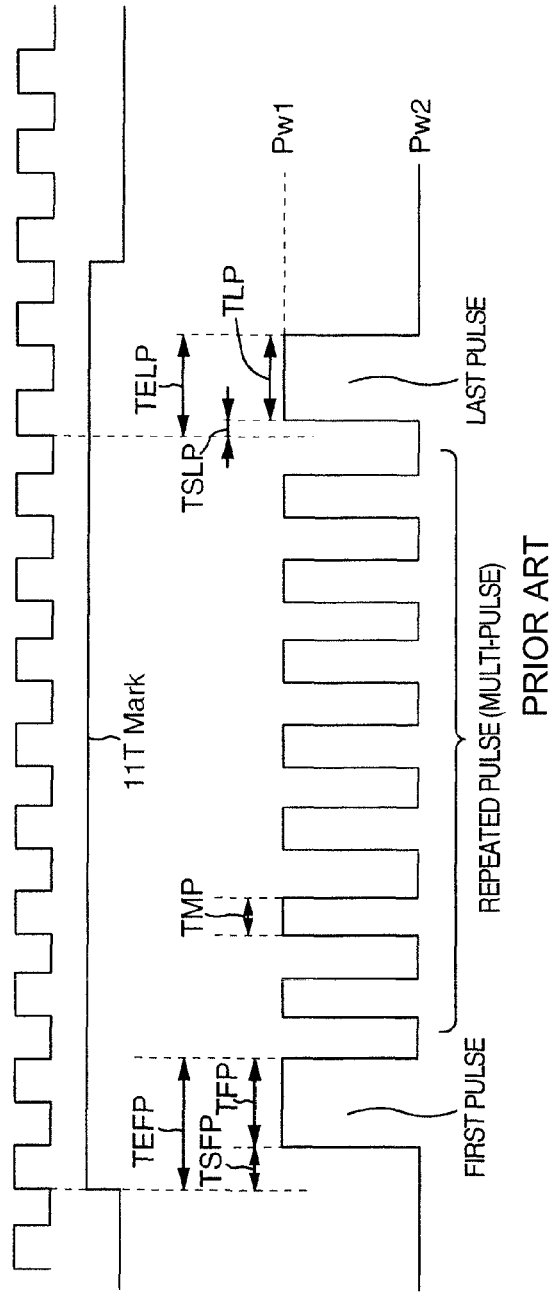
FIG. 1 schematically shows 11T mark recording waveform of a 4.7 GB DVD-RAM.
Figure 2A:
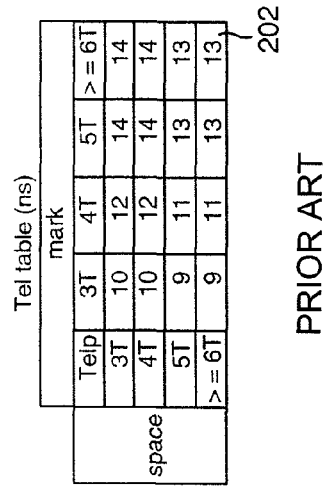
FIG. 2A and FIG. 2B show an example of recording parameter control table.
Figure 2B:
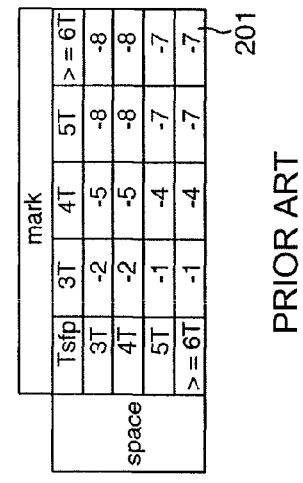

During this adjustment, linearity for the recording velocity is checked for the recording parameter which is advised not to be adjusted in the drive in the medium specification (hereinafter, referred to as basic recording parameter). In the DVD-RAM of the present embodiment, "TFP, TMP, TLP, TCL, TEFP, TSLP" in FIG. 1 and "TSFP (201 in FIG. 2) when a mark of 6T or above follows the space of 6T or above, TELP (202 in FIG. 2) when space of 6T or above follows a mark of 6T or above" are the basic recording parameters.

As has been described above, the aforementioned basic recording parameters can all be set so that they have a logically linear relationship with respect to the recording velocity. However, a slight error may be generated in each recording parameter value by the recording parameter decision procedure and the value rounding.

Figure 4:
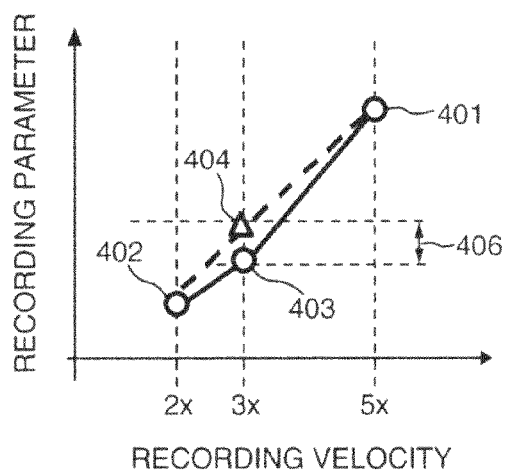
FIG. 4 schematically shows an example of relationship between the recording velocity and recording parameter.

For this, as shown in FIG. 4, from the recording parameter value 401 obtained by the highest recording velocity (5× recording in this case) and the recording parameter value 402 obtained by the lowest recording velocity (2× recording in this case), between them, the recording parameter value 404 of the velocity (3× recording in this case) at which a medium manufacturer provides a recording parameter is calculated. A difference ΔPt406 between the value thus obtained and the aforementioned velocity obtained in the procedure 1 and procedure 2, i.e., 3× recording parameter value 403 in this case is calculated.

This ΔPt is compared to an error allowance value defined for each recording parameter. If the ΔPt is not greater than the error allowance value, the adjustment is completed. If the ΔPt is greater than the error allowance value, the recording parameter is again adjusted by the mark reproduction waveform. After this adjustment, if the inclination at each recording velocity of reproduction waveform of the long mark defined above and the linearity of the basic recording parameter do not satisfy a predetermined condition, the recording medium is improved by considering the recording medium composition and material.

It should be noted that the recording parameter condition extraction in the above is performed by simultaneously comparing to the data to clock jitter (hereinafter, referred to simply as jitter) during reproduction of the recording waveform, reproduction waveform asymmetry, and other specification values.

Procedure 3. Shift Table, Power Level Adjustment

In the procedure 3, after adjustment of the recording parameter, adjustment of recording parameters other than the basic recording parameters adjusted in the procedure 2 at each recording velocity is performed. In this embodiment, the area other than 201 and 202 of the shift table in FIG. 2 and the recording power level adjustment correspond to this adjustment. As the adjustment method, it is possible to employ a method to minimize the reproduction jitter. For example, it is possible to employ the technique defined in the medium specification such as the DVD-RAM.

It should be noted that the basic recording parameters adjusted in the procedure 2 are not modified in the procedure 3. This is for maintaining the shape of the long mark reproduction waveform and the recording parameter linearity for the recording velocity in the procedure 2.

Procedure 4. Recording Parameter Linearity Check

In the procedure 4, linearity for the recording velocity is checked for the recording parameter at each recording velocity extracted in the procedure 3. In the DVD-RAM of the present embodiment, linearity for the recording velocity is checked for the recording parameters shown in FIG. 1 and the TSFP and TELP shift tables shown in FIG. 2.

When the linearity of basic recording parameters is guaranteed in the procedure 2, these recording parameters can all be set so that they have theoretically linear relationship with the recording velocity. However, similarly as in the procedure 2, an error may be involved by rounding the recording parameter values and accordingly, in the same way as the procedure 2, an allowable error value is set for each recording parameter so as to check the linearity.

Procedure 5. Setting Flag for Variable Velocity Recording

Depending on the recording medium film composition and material, there is a case that an appropriate parameter cannot be selected by the adjustments of the procedures 1 to 4. Such a medium cannot cope with the variable velocity recording such as the CAV recording and should be distinguished from those which satisfy the adjustments of the procedures 1 to 4. The procedure 5 sets a judgment flag indicating presence/absence of a recording parameter adjusted by the procedures 1-4 so as to distinguish it.

For example, in the DVD-RAM standard, bit 613 and after in the RFIL sector where the recording parameters provided by a medium manufacturer are recorded are reserved (empty bits). Here, the 1-bit judgment flag can be set for distinguishing.

In the drive, when inserting a medium, it is checked whether the judgment flag is present. When the bit is 1, the medium is recognized as a variable velocity recording medium and at a recording velocity between the medium lowest recording velocity and the highest recording velocity, recording is performed by using a recording parameter obtained by linear interpolation or the recording parameters provided by a medium manufacturer for the lowest recording velocity and the highest recording velocity. In the case of the DVD-RAM 5× recording medium of the present example, from the recording parameters provided by the medium manufacturer for the 2× recording and 5× recording, it is possible to calculate the recording parameters at the recording velocities between them such as 2.5×, 3×, and 4×.

By using the procedures 1-4 shown in this embodiment, it is possible to easily calculate recording parameters of recording velocities other than those corresponding to the recording parameters provided by a medium manufacturer from the recording parameters provided by the medium manufacturer. When performing continuous recording in the CAV recording where the recording velocity is successively changing, it is possible to always calculate an optimal recording parameter. Moreover, a high quality CAV recording is guaranteed by the optical disk of the present embodiment and a user can perform data recording of a high quality.

Moreover, by providing a flag indicating the employment of the procedures 1-4, it is possible to know whether the recording medium can cope with the CAV recording and an appropriate recording control can be performed. That is when the recording medium is judged to cope with the CAV recording, CAV recording is performed and when the recording medium is judged not to cope with the CAV recording, CAV recording is not performed. Moreover, for a drive manufacturer, it is possible to simplify the write strategy setting method when realizing a high velocity recording by CAV recording, which reduces the drive development time and the learning time during the write strategy adjustment.

It should be noted that when employment of the procedures 1-4 is guaranteed by the medium standard, there is no need of checking the recording medium whether it can cope with the CAV recording and no flag is required.

Furthermore, even when areas recorded with different recording velocities are adjacent to each other, the reproduction waveform shapes match and accordingly, it is possible to perform stable reproduction.

[Embodiment 2]

Next, explanation will be given on a second embodiment. The second embodiment also sets recording parameters in the same way as the first embodiment. However, the procedure 2 is different from that of the first embodiment. Hereinafter, explanation will be given on the procedure 2.

In the procedure 2 of the first embodiment, by monitoring the reproduction waveform of the long mark of 6T or above recorded by using the recording parameters of different velocities, the inclination of the mark portion is substantially matched between the recording velocities. In the present embodiment, the inclination of the reproduction waveform of the long mark of 6T or above is compared to the long space portion of 6T or above or the inclination of the reproduction waveform of a reserved area, thereby deciding an optimal recording parameter.

Figure 5A:
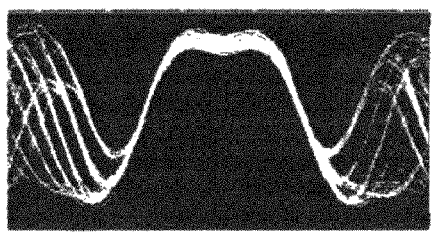
FIG. 5A and FIG. 5B are an example of a 10T space reproduction waveform and its schematic diagram.
Figure 5B:
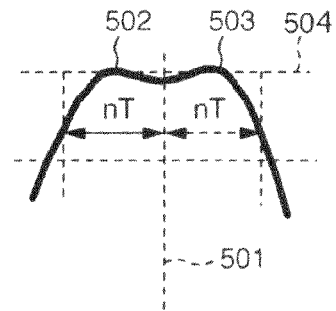
Figure 6:
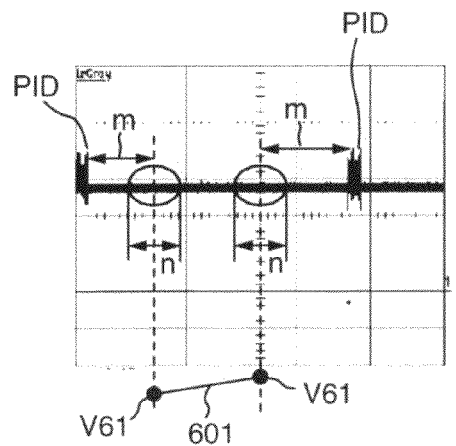
FIG. 6 shows a waveform of a 4.7 GB DVD-RAM reserved area.

For example, in the case of the space portion, as shown in FIG. 5, the center of the space portion waveform 501, i.e., in the case of 10T space, for the areas before and after the 5T portion, the straight line 504 connecting peaks 502 and 503 of the each area is made a reference value Asp. Alternatively, an average potential between arbitrary two areas within one track of a reserved area is calculated and from the difference, a waveform inclination reference value Anw of the reserved area is calculated. For example, in the DVD-RAM, as shown in FIG. 6, the inclination 601 is calculated from the average potentials V61 and V62 of n sectors of m sectors (m and n are arbitrary numbers) before and after the PID (physical ID) area so as to serve as the reference value Anw.

Figure 7A:
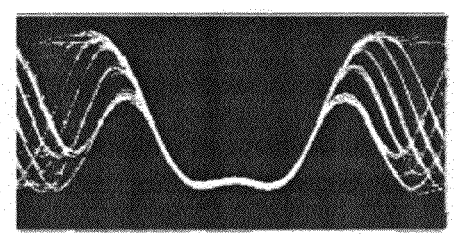
FIG. 7A and FIG. 7B are an example of a 10T mark reproduction waveform and its schematic diagram.
Figure 7B:
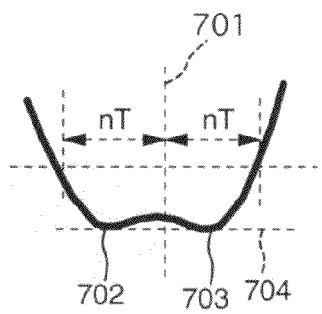

Next, as has been calculated in the first embodiment, the inclinations A×2, A×3, A×5 at the mark portion are calculated. In this embodiment, the recording parameters are set so that A×2, A×3, A×5 at the mark portion are substantially matched with the inclinations at the space portion Asp and Anw. FIG. 7 shows the reproduction waveform of the mark portion after the actual adjustment. In the same way as in the first embodiment, the inclination of the mark portion of the long mark reproduction waveform is obtained by the center point 701 and the left and the right peaks 702 and 703. When the obtained inclination 704 is defined for each velocity as A×2, A×3, A×5, the recording parameters are adjusted so that differences between these inclination values A×2, A×3, A×5 and Asp, Anw are substantially zero as shown by 704 in FIG. 7.

By adjusting the recording parameters by the procedure of this embodiment, the mark shape approaches a uniform ellipse as compared to the long mark of the first embodiment and it is possible to improve the erase characteristic and cross talk characteristic during overwrite and disk resistance against the rewrite.

[Embodiment 3]

Next, explanation will be given on a third embodiment. In this embodiment, the recording parameter setting method and variable velocity recording bit are identical to the first embodiment. However, the method for checking the recording parameter linearity in the procedures 2 and 4 is different. Hereinafter, explanation will be given on the procedures 2 and 4.

In the procedure 2 of the first embodiment, a difference between the recording parameter obtained by the linear interpolation and the recording parameter obtained by a condition of the waveform inclination defined for the long mark reproduction waveform of 6T or above is compared to a predetermined error allowance value to judge the linearity of the recording parameter.

The procedure 2 of the present embodiment calculates only a basic recording parameter (which is made basic recording parameter A) at the medium maximum recording velocity (5× recording in this embodiment) and a basic recording parameter (which is made basic recording parameter B) at the medium minimum recording velocity (2× recording in this embodiment). A basic recording parameter (which is made basic parameter C) provided by a medium manufacturer at the recording velocity between them is calculated by linear interpolation of the basic recording parameters A and B.

When this is applied to FIG. 4, 401 is the basic recording parameter A, 402 is the basic recording parameter B, and 404 is the basic recording parameter C. Next, the area recorded by using the basic parameter C at an adaptive recording velocity of the basic parameter C is reproduced at a predetermined reproduction velocity, for example 2× if DVD-RAM, to obtain the reproduction jitter. If the jitter value σ is smaller than a predetermined allowance jitter value σr, i.e., c the adjustment is terminated. If σ>σr, in the same way as in the first embodiment, "the recording parameter is re-adjusted by the long mark reproduction waveform" and "the recording medium is improved by considering the recording medium composition and material".

In the procedure 4, in the same way as in the procedure 2, from the recording parameter obtained by the medium maximum recording velocity and the minimum recording velocity, the recording parameter provided by the medium manufacturer is interpolated at the recording velocity between them. The reproduction jitter σs as a result of recording by the recording parameter is compared to a predetermined allowance jitter value σrs so as to check the linearity of the recording parameter.

In the procedure of the present embodiment, there is no need of extracting basic recording parameters other than at the maximum recording velocity and the minimum recording velocity or other recording parameters. Accordingly, it is possible to reduce the basic recording parameters and the time required for deciding the basic recording parameters.

Moreover, in this embodiment, for interpolating the basic recording parameters and other recording parameters, the basic recording parameters at the maximum recording velocity and the minimum recording velocity specified in the medium and other recording parameters are calculated. However, it is also possible to perform interpolation by interpolation and extrapolation of basic recording parameters at two or more arbitrary different velocities provided by the medium manufacturer and other recording parameters.

[Embodiment 4]

Figure 10:
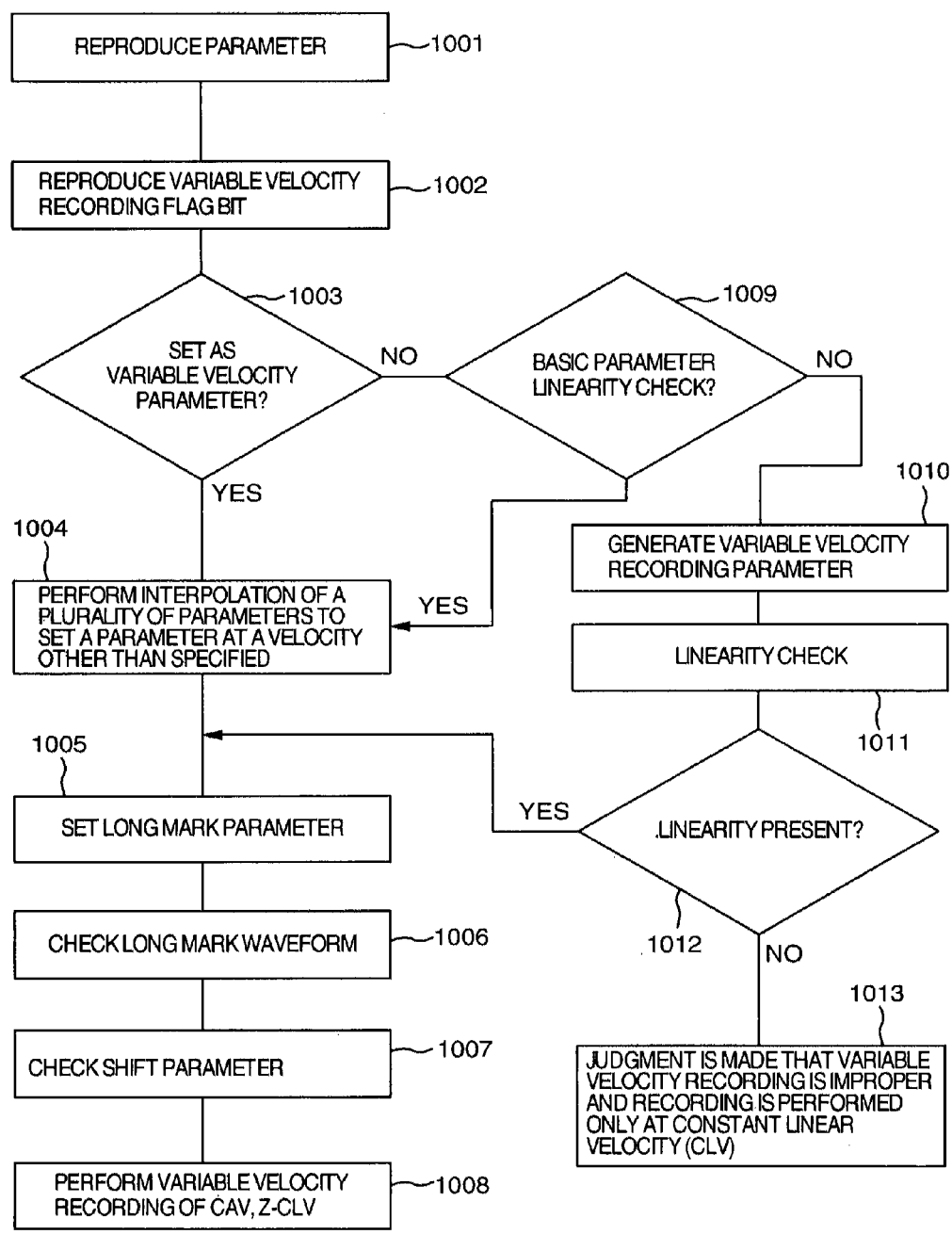
FIG. 10 is a flowchart showing a drive operation sequence.

Next, explanation will be given on a drive according to the present invention as a fourth embodiment of the present invention. FIG. 10 shows an example of processing procedure of the drive performing variable velocity recording on a disk having description of advised recording parameters for a plurality of recording velocity.

Figure 11:
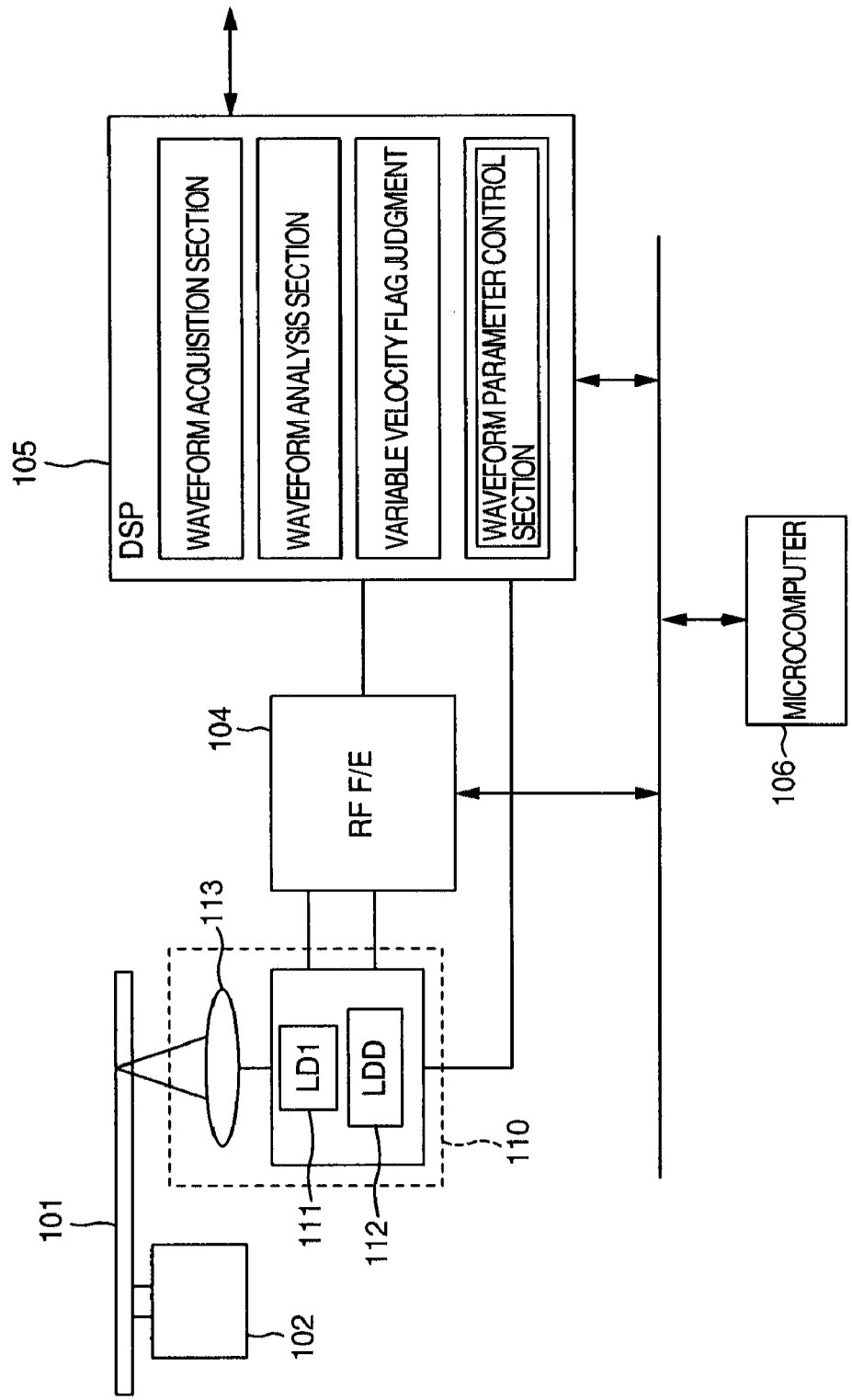
FIG. 11 is a block diagram of a drive according to the present invention.

FIG. 11 shows configuration of the drive according to the present embodiment. In the drive of the present embodiment, a laser diode 111 is driven by a laser driver (LDD) 1121 mounted on a pickup 110 and a laser beam is emitted from an objective lens 113. The laser emission timing is controlled by a waveform parameter controller in a DSP 105. It should be noted that in this embodiment the waveform controller is built in the DSP but it may also be a separate chip or mounted on the LDD.

The reproduction signal is introduced from the pickup through RF F/E LSI 104 into the waveform acquisition section in the DSP and a waveform analyzer so as to be subjected to waveform processing. In the waveform acquisition section, acquired waveform data is A/D converted to obtain digital data, which is sent to the waveform analyzer. Moreover, a part of data is acquired directly by a microcomputer 106, which performs waveform analysis. Furthermore, in the DSP, a variable velocity recording flag detection function is provided to judge presence/absence of the flag. It should be noted that presence/absence of the flag can also be judged by the microcomputer and the flag detection function need not necessarily be provided in the DSP.

Procedure 1. Checking the Variable Velocity Recording

Firstly, check is made to determine whether the variable velocity recording flag shown in procedure 5 of the first embodiment is recorded on the medium to be reproduced (step 1003). When the variable velocity recording flag is ON in the medium (medium which can cope with variable velocity recording), according to the recording parameter at a particular linear velocity recorded on the medium, a recording parameter value at a linear velocity other than that is calculated by linear calculation so as to perform variable velocity recording (steps 1004-1008).

Procedure 2. Checking the Linearity of the Recording Parameter Advised by the Medium Manufacturer When the variable velocity recording flag is OFF or the variable velocity recording flag is not set, linearity is checked between the basic recording parameter advised by the medium manufacturer and advised not to be modified in the drive and the recording velocity (step 1009). It should be noted that the check method may be, for example, the method shown in the procedure 2 of the first embodiment of the present invention in which a predetermined recording parameter error value is defined or the method shown in the procedure 2 of the third embodiment of the present invention in which a predetermined jitter allowance value is defined.

When the linearity can be confirmed, variable velocity recording such as CAV recording is performed while interpolating the recording parameter at each linear velocity from the recording parameters read out from the medium (steps 1004-1008).

When the linearity cannot be confirmed, by using a part of the recording parameters recorded on the medium, the basic recording parameters and other recording parameters are extracted (step 1010).

Procedure 3. Extracting the Basic Recording Parameter by the Long Mark Waveform and Checking the Linearity By using recording parameters at a plurality of recording velocities provided by the medium manufacturer, long mark recording and long space recording of 6T or above are performed at each recording velocity. In the area where they are recorded, a reproduction waveform of a long mark of 6T or above is extracted and in the same way as is defined in the first embodiment, the inclination of the long mark reproduction waveform when reproduction is performed at a constant velocity is measured. The recording parameters for the long mark and long space of 6T or above are adjusted so that the inclinations of the long mark reproduction waveform at the respective recording velocity are substantially matched. This recording parameter corresponds to the basic recording parameter in the first embodiment.

Figure 8:
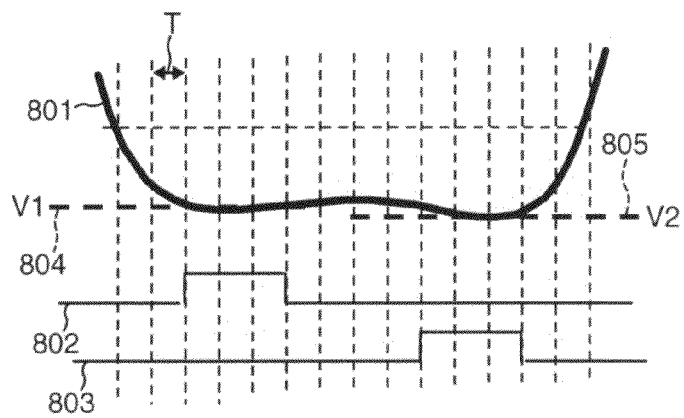
FIG. 8 schematically shows an example of 14T mark reproduction waveform and sample pulse.

As for the measurement method for measuring the long mark reproduction waveform inclination, for example, in the case of DVD-RAM, there is a method for extracting the sync pattern 14T in the drive and generating the sample pulses shown in 802 and 803 for the 14T mark reproduction waveform 801 as shown in FIG. 8. Since the sync pattern repeatedly appears at the same timing, it is possible to generate such a sample pulse. This sample pulse generates a window at identical positions at the both sides of the center of the 14T mark reproduction waveform with an identical width. By calculating a difference V between voltage values V1 and V2 of the hold signals 804 and 805 held only during the window period of the sample pulses 802 and 803, the value obtained is defined as the inclination of the long mark reproduction waveform.

Figure 9:
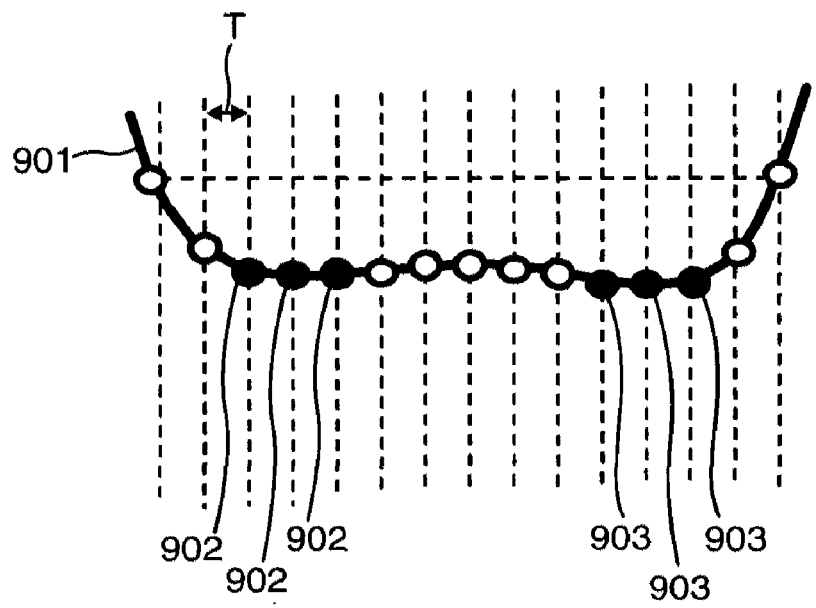
FIG. 9 schematically shows an example of 14T mark reproduction waveform and sample system.

Moreover, there is another method for measuring the inclination. As shown in FIG. 9, the reproduction waveform 901 is AD converted by a reproduction clock cycle, for example. From the sampling sequence obtained, a predetermined long mark reproduction waveform, i.e., 14T reproduction waveform in this case, is extracted. At the positions at an identical distance of time width from the time center of the long mark waveform, average values of the sample values 902, 903 of the identical number of samples are calculated. A difference between the obtained average values is defined as the inclination of the long mark reproduction waveform. By using one of these methods, a linearity parameter is decided.

Furthermore, for confirmation of the basic recording parameters obtained in the respective recording velocities, recording is actually performed to check the linearity (step 1011). The check can be performed by using the method of the procedure 3 described in the first and the second embodiment. If the linearity of the basic recording parameters cannot be confirmed by this procedure, return to the procedure 2 and modify the inclination of the long mark reproduction waveform. If the linearity of the basic parameters cannot be confirmed even by this, only the constant velocity recording such as CLV is performed (step 1013).

The extraction of the basic recording parameters and linearity check are preferably performed while performing comparison to the data to clock jitter (hereinafter, referred to simply jitter) during reproduction of the recording waveform and the standard value of the reproduction waveform asymmetry.

Procedure 4. Shift Table, Power Level Adjustment

After adjustment of the basic recording parameters, adjustment of recording parameters other than the basic recording parameters adjusted in the respective velocities in the procedure 2 is performed.

Here, in the same way as in the first embodiment, the basic recording parameters adjusted in the procedure 2 are not modified. As the adjustment method, various techniques can be suggested. It is also possible to use the method defined in the medium standard such as the DVD-RAM.

Procedure 5. Checking the Recording Parameter Linearity

For the recording parameters at the respective recording velocities extracted in the procedure 3, linearity for the recording velocity is checked. In this case also, in the same way as in the procedure 2 of the first embodiment, the respective recording parameter values may have errors caused by rounding. Accordingly, in the same way as the procedure 2, an allowance error value is set for each of the recording parameters to check the linearity.

The drive having the aforementioned procedures have the following advantages.

1. By referencing the variable velocity recording flag, it is possible to easily identify the medium supporting the variable velocity recording.

2. When a medium supporting variable velocity recording is identified, the write strategy setting becomes easy when performing the variable velocity recording such as CAV and it becomes possible to reduce the write strategy learning time.

3. By referencing the variable velocity recording flag, in a medium not supporting variable velocity recording, it is possible to prevent recording failure when performing the variable velocity recording by using the recording parameter provided by a medium manufacturer.

4. Even in a medium not provided with a recording parameter corresponding to variable velocity recording from a medium manufacturer, by using the aforementioned procedures, it is possible to obtain the write strategy and a recording parameter corresponding to the variable velocity recording and realize variable velocity recording such as CAV recording.

It should be noted that by holding the recording parameters obtained by the present procedures in the drive such as in the EEPROM, it is possible to rapidly set the recording parameters when the same medium is inserted into the drive, thereby reducing the recording parameter learning time.

Moreover, in the above, instead of performing variable velocity recording according to the recording parameters provided by the medium manufacturer, it is possible to perform variable velocity recording by using the learning result of recording parameter optimal for the drive by using the method defined by the medium standard according to the recording parameters provided by the medium manufacturer instead of the recording parameters provided by the medium manufacturer.

[Embodiment 5]

Next, explanation will be given on a fifth embodiment. In this embodiment, the recording parameter setting method and the variable velocity recording bit are identical to the first embodiment, but the recording parameter linearity check in the procedures 2 and 4 are different. Hereinafter, explanation will be given on the procedures 2 and 4 of this embodiment.

This embodiment is characterized in that when checking the linearity of the parameter defining the time-axis direction information of the recording pulse with respect to the recording velocity in the procedure 2 and 4 of the first embodiment, a value of the parameter normalized by the recording clock cycle is used. For example, in the case of DVD-RAM, the recording parameters to be processed are TFP, TMP, TLP, TCL, TEFP, TSLP, TSFP, and TELP.

Figure 12:
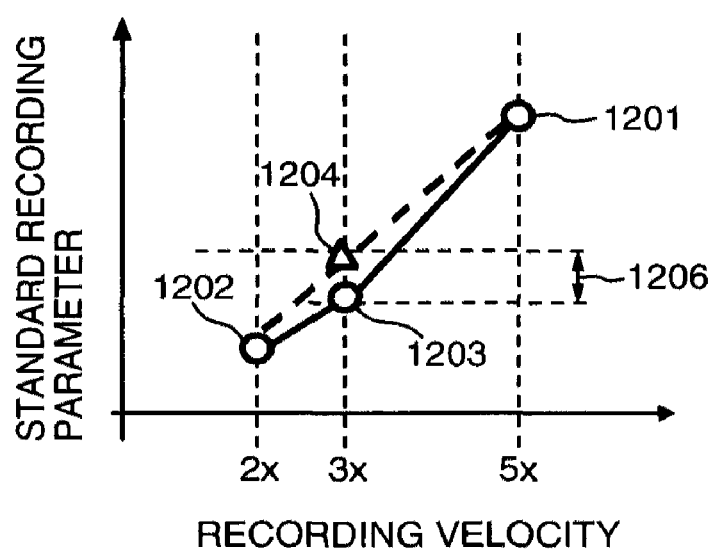
FIG. 12 schematically shows an example of relationship between the recording velocity and the normalization recording parameter.

Explanation will be given by making these parameters Tpr and using FIG. 12. The recording parameter value (Tpr5×) obtained at the maximum recording velocity (in this case, 5× recording) and the recording parameter value (Tpr2×) obtained at the minimum recording velocity (in this case, 2× recording) are normalized by the recording clock cycle of the respective recording velocities to obtain the normalized recording parameters Tpr5×s and Tpr2×s. The normalization is performed by an equation (1) as follows.

$$Tpr[n]xs = Tpr[n]x/Tw[n] \quad (1)$$

In Equation (1), [n] represents times of speed (recording speed) and Tw[n] represents a recording clock cycle at the n times of speed. The Tpr5×s is shown by 1201 in FIG. 12. Similarly, Tpr2×s is shown by 1202 in FIG. 12.

These are used to calculate the normalized recording parameter value 1204 (Tpr3×s_I) of the speed (3× recording in this case) at which recording parameter is provided by the medium manufacturer. By calculating a difference ΔTpr3×s 1206 between the Tpr3×s_I and the aforementioned speed obtained by the procedures 1 and 2 shown in the first embodiment, i.e., the 3× recording parameter value (Tpr3×) in this case which is normalized into a normalized recording parameter value Tpr3×s (1203 in FIG. 12) by Equation (1), the difference is compared to an error allowance value for the predefined normalized recording parameter, thereby judging the adjustment end.

Thus, it is possible to check the linearity with the recording pulse time-axis direction information not depending on the recording velocity, thereby facilitating to assure the linearity.

It should be noted that in this embodiment, comparison with the error allowance value is performed by using the difference of the normalized recording parameter values but it is also possible to return the Tpr3×s_I obtained above to the previous time information Tpr3×_I by Equation (2) as follows, calculate the difference ΔTpr3× with the aforementioned Tpr3× not normalized, and compare the error allowance value for the predefined recording parameter, thereby judging the adjustment end.

$$Tpr3x\_1 = Tpr3xs\_1 \times Tw[3] \quad (2)$$

[Embodiment 6]

Next, explanation will be given on a sixth embodiment. In this embodiment, the recording parameter setting method and the variable velocity recording bit are identical to the third embodiment but the recording parameter linearity check method in the procedures 2 and 4 is different. Hereinafter, explanation will be given on the procedures 2 and 4 of the present embodiment.

This embodiment is characterized in that when checking the linearity for the recording velocity of the parameter defining the recording pulse time-axis direction information in the procedures 2 and 4 of the third embodiment, the value of the parameter normalized by the recording clock cycle is used. The method explained in the fifth embodiment is used to obtain the normalized recording parameter Tpr3×s_I from the normalized recording parameters Tpr5×s, Tpr2×s and the aforementioned Equation (2) is used to calculate the time information Tpr3×_I. The reproduction jitter us as a result of recording performed with the recording parameter Tpr3×_I thus obtained is compared to a predetermined allowance jitter value urs to check the linearity of the recording parameter.

Thus, it is possible to check the linearity with the recording pulse time-axis direction information not depending on the recording velocity, thereby facilitating to assure the linearity.

[Embodiment 7]

Next, explanation will be given on a seventh embodiment. This embodiment is characterized in that when calculating the recording parameter for performing variable velocity recording in the procedure 1 of the fourth embodiment of the present invention, linearity calculation is performed by using the parameter normalized by the recording clock cycle using the method shown in the fifth embodiment of the present invention.

Moreover, in the recording parameter linearity checks in the procedures 2 to 4 in the fourth embodiment of the present invention, check of the recording parameter linearity indicating the time information is performed by using the parameter normalized by the recording clock cycle using the method shown in the fifth embodiment of the present invention.

Thus, it is possible to check the linearity with the recording pulse time-axis information not depending on the recording velocity and facilitate to assure the linearity.

It should be noted that the long mark and long space of 6T or above in the aforementioned embodiments intend for mark length and space length in which voltage of the waveform mark portion and space portion during reproduction is not affected by the preceding and following marks and spaces. This can also be defined as a mark and space of one or more times of the laser spot diameter focused on the recording medium. For example, when the laser spot diameter is 1 μm in the DVD-RAM recording apparatus, this is equivalent to the length of 7.14T. That is, it is also possible to perform the aforementioned procedures by using a long mark and a long space of 8T or above.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A recording method for recording information on an optical disk on which information as to laser pulse timings at a plurality of recording speeds is recorded, the method comprising:

wherein the laser pulse timings depend on a plurality of parameters;

wherein the parameters comprise at least a first parameter that is a value obtained by normalizing a time difference between a rise edge or a fall edge of a reference clock to be used for recording and a fall edge of a laser pulse in accordance with a recording clock cycle, and a second parameter that is a value obtained by normalizing a width of the laser pulse in accordance with the recording clock cycle;

reading, from the optical disk, information as to the first parameter and the second at a first recording speed and a second recording speed;

adjusting the first parameter at the first speed and the first parameter at the second speed;

determining a proportional relationship between the adjusted first parameter at the first speed and the adjusted first parameter at the second speed;

determining a proportional relationship between the read second parameter at the first speed and the read second parameter at the second speed; and performing a CAV (Constant Angular Velocity) recording by using the proportional relationship between the adjusted first parameter at the first speed and the adjusted first parameter at the second speed and the proportional relationship between the read second parameter at the first speed and the read second parameter at the second speed.

2. The recording method according to claim 1, wherein the first parameter thus determined is a laser pulse timing to be used for recording a mark having a size not smaller than a diameter of a laser spot on a recording layer.

3. The recording method according to claim 1, wherein the first parameter thus determined is a laser pulse timing to be used for recording a mark having a length six times or more of a reference clock cycle to be used for recording.

4. The recording method according to claim 1, wherein the first parameter thus determined is a first parameter to be used for recording a mark having a size not smaller than a diameter of a laser spot on a recording layer.

5. The recording method according to claim 1, wherein the first parameter thus determined is a first parameter to be used for recording a mark having a length six times or more of a reference clock cycle to be used for recording.

6. A recording apparatus for recording information on an optical disk on which information as to laser pulse timings at a plurality of recording speeds is recorded, the apparatus comprising:
   wherein the laser pulse timings depend on a plurality of parameters;
   wherein the parameters comprise at least a first parameter that is a value obtained by normalizing a time difference between a rise edge or a fall edge of a reference clock to be used for recording and or a fall edge of a laser pulse, and a second parameter that is a value obtained by normalizing a width of the laser pulse in accordance with the recording clock cycle;
   a reproduction circuit that reads, from the optical disk, information as to the first parameter and the second parameter at a first recording speed and a second recording speed;
   a signal processing circuit that adjusts the first parameter at the first speed and the first parameter at the second speed, determines a proportional relationship between the adjusted first parameter at the first speed and the adjusted first parameter at the second speed, determines a proportional relationship between the read second parameter at the first speed and the read second parameter at the second speed; and
   a recording circuit that performs CAV recording by using the proportional relationship between the adjusted first parameter at the first speed and the adjusted first parameter at the second speed and the proportional relationship between the read second parameter at the first speed and the read second parameter at the second speed.

7. The recording apparatus according to claim 6, wherein the first parameter determined by the signal processing circuit is a first parameter to be used for recording a mark having a size not smaller than a diameter of a laser spot on a recording layer.

8. The recording apparatus according to claim 6, wherein the first parameter determined by the signal processing circuit is a laser pulse timing to be used for recording a mark having a length six times or more of a reference clock cycle to be used for recording.

9. The recording apparatus according to claim 6, wherein the first parameter determined by the signal processing circuit is a first parameter to be used for recording a mark having a size not smaller than a diameter of a laser spot on a recording layer.

10. The recording apparatus according to claim 6, wherein the first parameter determined by the signal processing circuit is a first parameter to be used for recording a mark having a size not smaller than a diameter of a laser spot on a recording layer.

* * * * *

UNITED STATES PATENT AND TRADEMARK OFFICE
CERTIFICATE OF CORRECTION

PATENT NO. : 8,289,827 B2  
APPLICATION NO. : 11/974330  
DATED : October 16, 2012  
INVENTOR(S) : Koichiro Nishimura et al.

Page 1 of 1

It is certified that error appears in the above-identified patent and that said Letters Patent is hereby corrected as shown below:

On the Title Page:

At Item (73) Assignee,

"Hitachi, Ltd., Tokyo (JP)"

should read,

-- Hitachi, Ltd., Tokyo, (JP); Hitachi-LG Data Storage, Inc., Tokyo (JP) --

Signed and Sealed this
Twenty-sixth Day of February, 2013

Teresa Stanek Rea
*Acting Director of the United States Patent and Trademark Office*